(12) United States Patent
Warren et al.

(10) Patent No.: US 12,535,030 B2
(45) Date of Patent: *Jan. 27, 2026

(54) NATURAL GAS ENGINE

(71) Applicant: SMITH POWER PRODUCTS, INC., Salt Lake City, UT (US)

(72) Inventors: Micky Warren, Salt Lake City, UT (US); Christopher Fleming, Salt Lake City, UT (US); Michael Smith, Salt Lake City, UT (US); John De La Hunt, Salt Lake City, UT (US)

(73) Assignee: SMITH POWER PRODUCTS, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/356,165

(22) Filed: Jul. 20, 2023

(65) Prior Publication Data

US 2023/0358164 A1    Nov. 9, 2023

Related U.S. Application Data

(63) Continuation of application No. 17/653,618, filed on Mar. 4, 2022, now Pat. No. 11,746,693.

(60) Provisional application No. 63/264,778, filed on Dec. 1, 2021.

(51) Int. Cl.
  *F02B 65/00* (2006.01)
  *F02B 43/10* (2006.01)

(52) U.S. Cl.
  CPC .............. *F02B 65/00* (2013.01); *F02B 43/10* (2013.01); *F02B 2043/103* (2013.01)

(58) Field of Classification Search
  CPC ................................. F02B 43/10; F02B 65/00
  USPC ........................ 123/27 GE, 525, 590, DIG. 7
  See application file for complete search history.

(56) References Cited

U.S. PATENT DOCUMENTS

| | | | |
|---|---|---|---|
| 4,305,352 A | 12/1981 | Oshima et al. | |
| 5,613,472 A | 3/1997 | Edelmann et al. | |
| 6,223,718 B1 | 5/2001 | Vogelsang et al. | |
| 8,011,094 B2 | 9/2011 | Burkhart | |
| 9,641,047 B2* | 5/2017 | Collett | H02K 7/1807 |
| 10,036,347 B1* | 7/2018 | Sherry | F02B 63/04 |
| 10,541,633 B2 | 1/2020 | Hudson | |
| 11,214,746 B2* | 1/2022 | Okada | B01D 53/22 |
| 2012/0192580 A1* | 8/2012 | Santos | C10L 3/107 |
| | | | 165/300 |
| 2012/0205169 A1* | 8/2012 | Montocchio | B60T 10/02 |
| | | | 180/54.1 |

(Continued)

*Primary Examiner* — Hai H Huynh
*Assistant Examiner* — Johnny H Hoang
(74) *Attorney, Agent, or Firm* — MASCHOFF BRENNAN; Paul G. Johnson

(57) ABSTRACT

A system may include a natural gas engine; and a hydrodynamic device configured to convert mechanical energy of the natural gas engine into heat in a working fluid within the hydrodynamic device. The amount of fluid in the hydrodynamic device may be controlled by an electronically controllable valve, and the amount of fluid in the hydrodynamic device may control a resistive force of the hydrodynamic device. The system may also include a controller in communication with the natural gas engine and the hydrodynamic device, where the controller may be configured to automatically adjust the electronically controllable valve to maintain a working load on the natural gas engine at or above a threshold load.

20 Claims, 11 Drawing Sheets

(56) References Cited

U.S. PATENT DOCUMENTS

| | | | |
|---|---|---|---|
| 2013/0047955 A1* | 2/2013 | Reedy | B60W 10/06 |
| | | | 123/320 |
| 2013/0125842 A1 | 5/2013 | Frick | |
| 2013/0179022 A1* | 7/2013 | Ueno | F02D 29/02 |
| | | | 180/65.265 |
| 2015/0000630 A1* | 1/2015 | Coldren | F02D 41/0087 |
| | | | 123/304 |
| 2016/0201658 A1* | 7/2016 | Arapkoules | F04B 15/00 |
| | | | 417/208 |
| 2016/0290463 A1 | 10/2016 | Kamossa et al. | |
| 2017/0247993 A1* | 8/2017 | Parrella | E21B 43/2406 |
| 2020/0158039 A1* | 5/2020 | Aoki | B60W 20/00 |
| 2020/0239797 A1* | 7/2020 | Okada | B01D 69/00 |

* cited by examiner

NATURAL GAS ENGINE

CROSS-REFERENCE TO RELATED APPLICATIONS

This application is a continuation application of U.S. patent application Ser. No. 17/653,618 filed on Mar. 4, 2022, which claims the benefit of U.S. Patent Application Ser. No. 63/264,778, filed on Dec. 1, 2021; both disclosures of which are incorporated herein by reference in their entirety.

TECHNICAL FIELD

The present disclosure generally relates to a natural gas engine. For example, the natural gas engine consistent with the present disclosure may be directly applied and/or coupled to a fracking pump.

BACKGROUND

Engines are used to convert various forms of energy into mechanical force and/or motion. For example, a gasoline engine converts energy from the chemical bonds in gasoline and, through combustion, releases that energy and converts it into mechanical force. Natural gas (a naturally occurring hydrocarbon gas mixture with methane among other higher alkanes) can be used to power such engines.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments may include a system that includes a natural gas engine; and a hydrodynamic device configured to convert mechanical energy of the natural gas engine into heat in a working fluid within the hydrodynamic device. The amount of fluid in the hydrodynamic device may be controlled by an electronically controllable valve, and the amount of fluid in the hydrodynamic device may control a resistive force of the hydrodynamic device. The system may also include a controller in communication with the natural gas engine and the hydrodynamic device, where the controller may be configured to automatically adjust the electronically controllable valve to maintain a working load on the natural gas engine at or above a threshold load.

One or more embodiments of the present disclosure may include a device that includes a cylindrical body sized to interface with a front of a natural gas engine. The cylindrical body may include multiple bolt holes aligned with bolt holes on the front of the natural gas engine, and a key channel corresponding to a key of the front of the natural gas engine. The cylindrical body may also include an alignment post positioned at a predetermined offset from the key channel such that when the cylindrical body is mounted on the front of the natural gas engine, the key channel and the alignment post permit a single orientation of a crankshaft of the natural gas engine based on the predetermined offset, the single orientation corresponding to a pre-programmed engine operation.

One or more embodiments of the present disclosure may include a method. The method may include pre-heating engine coolant of a natural gas engine; lubricating the natural gas engine with oil; and after the pre-heating and the lubricating, engaging a starter of the natural gas engine. The method may also include engaging a hydrodynamic device associated with the natural gas engine to increase a load on the natural gas engine to at least twenty five percent of a load capacity of the natural gas engine.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The embodiments described in the present disclosure may relate to, among other things, the use of a hydrodynamic device to facilitate the use of a natural gas engine. For example, a controller may monitor the operation of the natural gas engine to maintain a threshold load on the natural gas engine via the hydrodynamic device. This may be particularly beneficial because, for many gas engines, during load increase the incoming air to the cylinders may become lean momentarily. This may lead to slow RPMs and possible uncontrolled combustion. However, using embodiments of the present disclosure may allow the natural gas engine to maintain the intake manifold pressure by maintaining a load on the natural gas engine such that the natural gas engine will accept additional fuel to maintain the rpms within a desirable range. Additionally, embodiments of the present disclosure may permit shedding of the parasitic load with usable load on the pump end as the usable load increases.

Natural gas engines may operate and/or be designed as lean burn (designed to burn with excess air) or rich burn (designed with the stoichiometrically balanced amount of air for the gas being burned) engines. Embodiments of the present disclosure may relate generally to lean burn engines. Lean burn engines may be susceptible to uncontrolled combustion (e.g., detonation), making them typically unsuitable for mechanical drive applications with variable load requirements. By providing one or more of the benefits of one or more of the embodiments of the present disclosure, operational characteristics of the natural gas engines may be closer to a compression ignition engine, rather than a typical lean burn natural gas engine.

Embodiments of the present disclosure are explained with reference to the accompanying figures.

Figure 1:
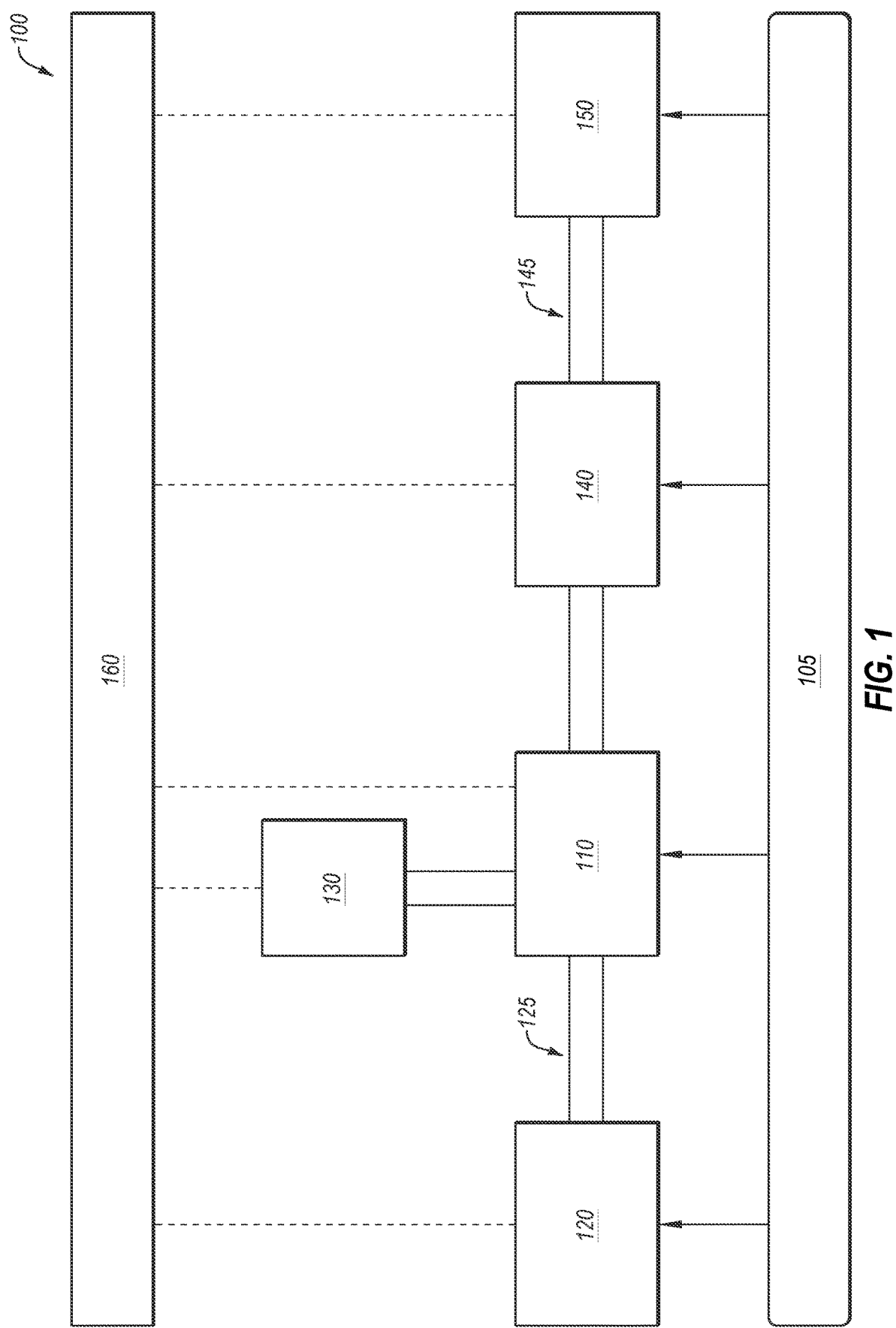
FIG. 1 illustrates a block diagram of an example system for implementing a natural gas engine.

FIG. 1 illustrates a block diagram of an example system 100 for implementing a natural gas engine 110, in accordance with one or more embodiments of the present disclosure. The system 100 may include a radiator 105, the natural gas engine 110, a hydrodynamic device 120, a first driveline 125 coupling the natural gas engine 110 to the hydrodynamic device 120, a generator 130, a transmission 140, a hydraulic pressure device 150, a second driveline 145 coupling the transmission to the hydraulic pressure device 150, and a controller 160.

In operation, the natural gas engine 110 may be operated to provide power through the transmission 140 to the hydraulic pressure device 150 to facilitate fracking operations. The controller 160 may facilitate use of the hydrodynamic device 120 to apply various loads to the natural gas engine 110. The generator 130 may, under the direction of the controller 160, provide power to the various components of the system 100.

The radiator 105 may be any device configured to perform thermal exchange to provide cooling to various components of the system 100. For example, the radiator may include a heat exchange for oil and/or coolant fluid of the natural gas engine 110, the generator 130, the transmission 140, and/or the hydraulic pressure device 150.

The natural gas engine 110 may include any device configured to utilize natural gas to convert the energy stored in the natural gas into mechanical force or motion. For example, the natural gas engine 110 may combust natural gas to drive one or more crankshafts. The natural gas engine 110 may operate at any scale and by any manufacturer. In some embodiments, the natural gas engine 110 may include an engine developed by MTU Solutions, such as an MTU 500 or 4000 series engine. As shown in FIG. 1, the natural gas engine 110 may be in mechanical communication with the hydrodynamic device 120, for example, via a driveline or other connection between a crankshaft or other driven component of the natural gas engine and the hydrodynamic device 120 and the transmission 140. In some embodiments, the mechanical coupling between the natural gas engine 110 and the hydrodynamic device 120 may be disengageable such that the hydrodynamic device 120 may apply a load or may be completely disengaged from the natural gas engine 110. In these and other embodiments, a clutch or other device may be utilized to disengage the hydrodynamic device 120 from the natural gas engine 110.

The hydrodynamic device 120 may include any device that provides a variable amount of resistance to rotation of a shaft based on fluid dynamics. For example, the hydrodynamic device 120 may resist rotation of the shaft based on friction between the fluid in the hydrodynamic device 120 and rotor and/or stator vanes within the hydrodynamic device 120. As the amount of fluid within the hydrodynamic device 120 increases, the resistance to rotation may increase and as the amount of fluid in the hydrodynamic device 120 decrease, the resistance to rotation may decrease. In some embodiments, the hydrodynamic device 120 may be implemented as a water brake, such as that produced by Parmac.

In some embodiments, the hydrodynamic device 120 may include a pulse-width modulated (PWM) valve to control an amount of fluid or a rate of entry/exit of fluid into the hydrodynamic device. By using the PWM valve, the hydrodynamic device 120 may include a variable degree of resistance, rather than a binary amount of load to be applied or not to be applied, for example, by engaging or disengaging a brake clutch associated with the hydrodynamic device 120.

Figure 3:
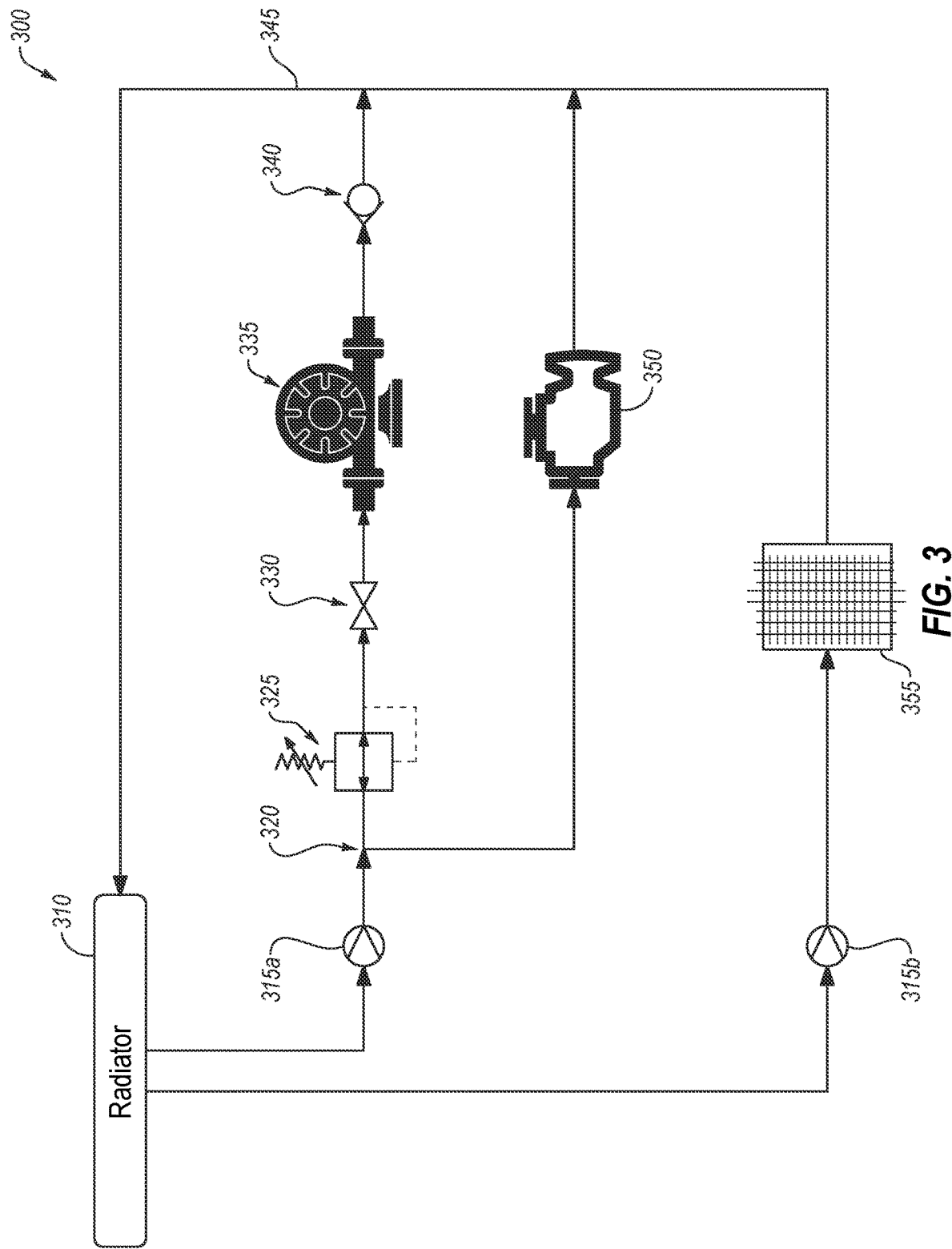
FIG. 3 illustrates a process flow diagram including a natural gas engine.

In some embodiments, the coolant fluid used by the radiator 105 to cool the natural gas engine 110 may also be used by the hydrodynamic device 120. By doing so, there may be fewer components and/or fluids utilized in the system 100. An example of the fluid flow of such coolant is illustrated in FIG. 3.

The hydrodynamic device 120 may interface with the natural gas engine at the front end of the natural gas engine 110. In some embodiments, a dry housing may be used to enclose the front end of the natural gas engine 110.

The first driveline 125 may include any mechanical connection between the hydrodynamic device 120 and the natural gas engine 110. For example, a drive shaft or other feature coupled to the crankarm of the natural gas engine 110 may convey the mechanical motion of the natural gas engine 110 to the hydrodynamic device 120 via the first driveline 125.

While illustrated as a hydrodynamic device 120, it will be appreciated that other resistive devices may be used to provide the load on the natural gas engine 110. For example, the hydrodynamic device 120 may be replaced by an electric generator that uses the rotational force of the first driveline 125 to supply a load to the natural gas engine 110. The use of such a resistive device may provide for a precise level of load based on the amount of electricity being generated. However, such a device may or may not provide heating or other corresponding use of the coolant fluid. As another example, an eddy brake may be used, where an electromagnetic field may be created to resist the rotation of portions of the natural gas engine 110 and/or the first driveline 125. As a further example, an oil shear brake may be used, where the first driveline 125 may be coupled to a friction stack of discs and plates with oil or other fluid therebetween, and the rotation of the first driveline 125 and the friction in the friction stack causes shear in the fluid resisting the rotation of the first driveline 125.

The generator 130 may include any device that generate and provides power, such as AC power, to the components of the system 100. For example, the generator 130 may be configured to burn gasoline or diesel fuel to generate electrical power to provide electrical power to the natural gas engine 110 (e.g., to facilitate ignition, computer-controlled timing of combusting, among other things, for the natural gas engine 110); to provide electrical power to the hydrodynamic device (e.g., to facilitate operation of the PWM valve); and/or to provide electrical power to any of the transmission 140, the hydraulic pressure device 150, and/or the controller 160.

The transmission 140 may include a device or component configured to provide a controlled application of power generated by the natural gas engine 110 to the hydraulic pressure device 150. The transmission 140 may include one or more "gears" representative of gear ratios between an input and an output gear in the transmission 140. For example, a low gear may be used to reduce the speed of rotation while increasing the torque when comparing the input and the output of the transmission 140. In some embodiments, the transmission 140 may facilitate shifting between gears such that higher speeds of rotations per minute (rpm) may be output into the hydraulic pressure device 150 in higher gears and lower speeds of rpms may be output into the hydraulic pressure device 150 in lower gears.

The hydraulic pressure device 150 may include any device configured to pump fluids and/or other materials at high pressures. For example, the hydraulic pressure device 150 may include a positive displacement pump configured to inject fracking liquid (e.g., water and sand) into a wellbore to cause hydraulic fracturing of geological formations and leave sand in the fractures to provide a path for oil and gas or other fluids to flow back through the fracking region and into the wellbore. The hydraulic pressure device 150 may include a power end that interfaces with the transmission and a fluid end that interfaces with the wellbore and the associated fluid to be pumped down a wellbore.

The transmission 140 may interface with the natural gas engine 110 at the back end of the natural gas engine 110. In some embodiments, a wet housing may be used to enclose the back end of the natural gas engine 110. By doing so, the lubrication, oil, and/or other fluids that may be used to operate the natural gas engine 110 may enclosed.

The second driveline 145 may include any mechanical connection between the transmission 140 and the hydraulic pressure device 150. For example, a drive shaft or other feature coupled to the output shaft of the transmission 140 may convey the mechanical motion of the natural gas engine 110 received from the transmission 140 to the hydraulic pressure device 150 via the second driveline 145.

The controller 160 may include any device configured to monitor and/or control operations of one or more of the components of the system 100. The controller 160 may be implemented as a computing device like a laptop, a special-purpose computing device such as a built-in computing device to one of the other components of the system 100, and/or a stand-alone computing device, any of which may be consistent with the computing device described with reference to FIG. 10. In some embodiments, the controller 160 may include an interface (e.g., a touchscreen, a keyboard, among others) via which a user maybe permitted to interact with the controller 160 and thereby interact with the natural gas engine 110 or other components of the system 100. For example, such a user may interact with the controller 160 to request a pre-start, start, shutdown, emergency shutdown, or other operations, of the natural gas engine.

The controller 160 may provide various commands or instructions to the various components of the system 100. For example, the controller 160 may instruct the natural gas engine 110 to perform a pre-starting procedure (such as the operations described in FIG. 5), a starting procedure (such as the operations described in FIG. 6), various operations associated with gear-shifting or other load management operations associated with operating the natural gas engine 110 (such as the operations described in FIG. 7), a shut down procedure (such as the operations described in FIG. 8), and/or an emergency shut down procedure (such as the operations described in FIG. 9).

In some embodiments, the controller 160 may monitor a load or speed of the natural gas engine 110 and may adjust the hydrodynamic device 120 to apply a load to the natural gas engine 110 such that the natural gas engine 110 maintains at least a threshold load when running, even if the threshold load is beyond what is applied by the hydraulic pressure device 150. For example, after starting up, the hydrodynamic device 120 may be engaged to increase the load on the natural gas engine 110 until at or above the threshold amount of load. As the hydraulic pressure device 150 adds additional load to the natural gas engine 110, the controller 160 may monitor the load and may decrease the load as applied by the hydrodynamic device 120, and may completely disengage the hydrodynamic device 120 from the natural gas engine 110 when the load as applied by the hydraulic pressure device 150 is beyond the threshold load.

In some embodiments, the initial threshold load (e.g., the load to which the hydrodynamic device 120 loads the natural gas engine without any load from the hydraulic pressure device 150) may include a 20% load, a 25% load, a 30% load, a 35% load, a 40% load, a 50% load, and/or any other similar or comparable loads. In some embodiments, the initial load may be between 10% and 40%, between 15% and 35% and/or between 20% and 30%. In some embodiments, the second load at which the hydrodynamic device 120 is disengaged from the natural gas engine 110 may include a set value such as 60%, 70%, 80%, 90%, or 100% load (of the load combined between the hydrodynamic device 120 and the hydraulic pressure device 150 via the transmission 140), or may be a ratio of the initial threshold, such as 1.5×, 2.0, 2.5× or some other ratio of the initial threshold.

In some embodiments, the controller 160 may be configured to monitor the operation of the natural gas engine 110 in conjunction with the transmission 140 and/or the hydraulic pressure device 150 such that when the transmission 140 is going to shift gears (whether upwards or downwards), the controller 160 may cause the hydrodynamic device 120 to engage with the natural gas engine 110 to maintain a load (such as at least the initial load described herein) as the transmission 140 undergoes the gear shift.

Modifications, additions, or omissions may be made to the system 100 without departing from the scope of the disclosure. For example, the designations of different elements in the manner described is meant to help explain concepts described herein and is not limiting.

Figure 2:
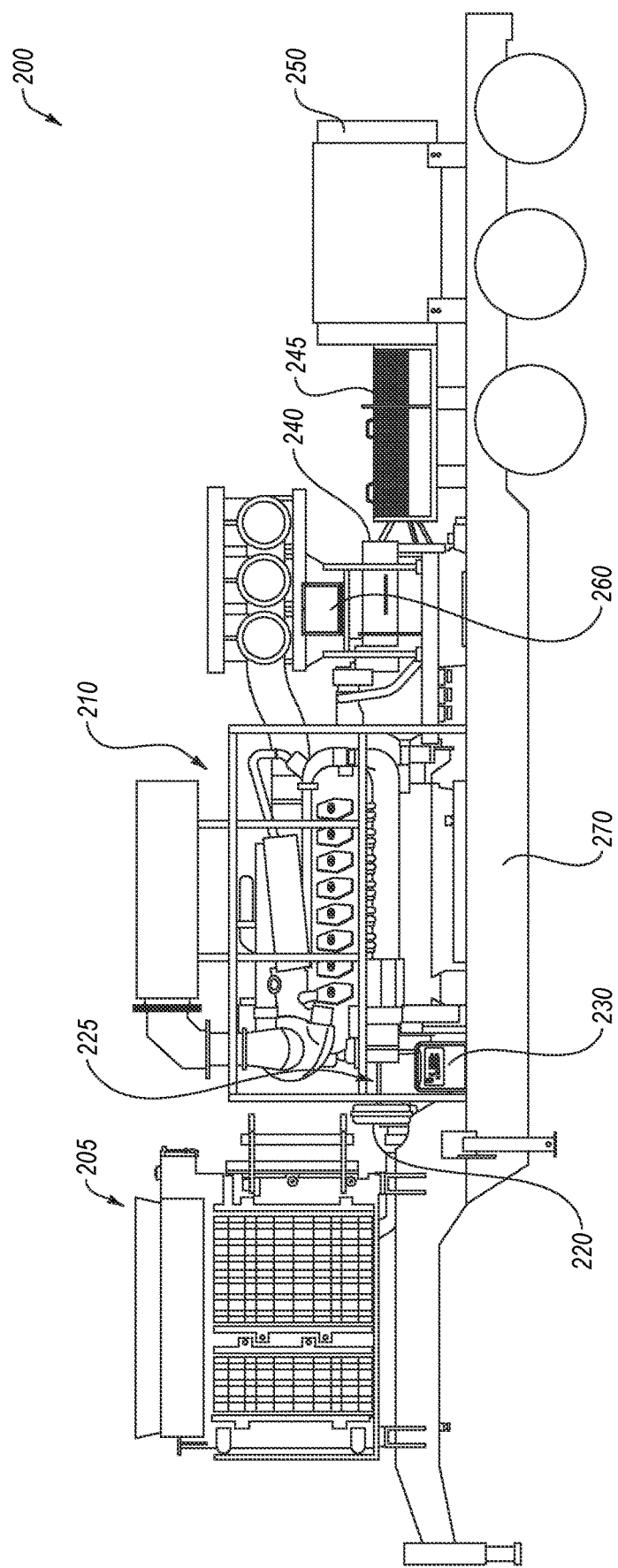
FIG. 2 illustrates another example system for implementing a natural gas engine.

FIG. 2 illustrates another example system 200 for implementing a natural gas engine 210, in accordance with one or more embodiments of the present disclosure. The system 200 may be similar or comparable to the system 100 of FIG. 1. For example, the system 200 may include a radiator 205 that may be similar or comparable to the radiator 105, the natural gas engine 210 that may be similar or comparable to the natural gas engine 110, a hydrodynamic device 220 that may be similar or comparable to the hydrodynamic device 120, a first driveline 225 that may be similar or comparable to the first driveline 125, a generator 230 that may be similar or comparable to the generator 130, a transmission 240 that may be similar or comparable to the transmission 240, a second driveline 245 that may be similar or comparable to the second driveline 145, a hydraulic pressure device 250 that may be similar or comparable to the hydraulic pressure device 150, and a controller 260 that may be similar or comparable to the controller 160. The system 200 may include a trailer 270 upon which components of the system 200 may be mounted such that the system 200 may be a mobile fracking station powered by the natural gas engine 210.

In operation, the system 200 may operate in a similar or comparable manner that described above with reference to FIG. 1. The system 200 may be a mobile fracking unit such that the system 200 may be readily moved between locations and/or to different wellbores while obtaining the benefits of the natural gas engine 210 coupled with the hydrodynamic device 220.

Modifications, additions, or omissions may be made to the system 200 without departing from the scope of the disclosure. For example, the designations of different elements in the manner described is meant to help explain concepts described herein and is not limiting.

FIG. 3 illustrates a process flow diagram 300 including a natural gas engine 350, in accordance with one or more embodiments of the present disclosure. includes a radiator 310 that may be similar or comparable to the radiator 105, a hydrodynamic device 335 that may be similar or comparable to the hydrodynamic device 120, and a natural gas engine 350 that may be similar or comparable to the natural gas engine 110. The diagram 300 may depict flow of fluid, such as an engine coolant, that may be used to provide cooling to the natural gas engine as well as provide the fluid disposed within the hydrodynamic device 335. The flowpaths within the diagram 300 will be explained with flow beginning and returning to the radiator 310. While reference may be made to fluid generically, it will be appreciated the fluid may include water, ethylene glycol, propylene, some additives, and/or other components.

In a first path, the fluid may flow from the radiator 310 to a first pump 315a. The first pump 315a, when powered on, may pump the fluid through a T-junction 320 towards both the natural gas engine 350 and the hydrodynamic device 335. In the path to the natural gas engine 350, the fluid may provide cooling to the natural gas engine 350 in a manner known to those of skill in the art, and the fluid may flow into a return path 345 flowing back into the radiator 310. While illustrated as a single component, it will be appreciated that the engine block, oil cooler, cylinder heads, turbo, and/or upper sections of the charge air cooler may be cooled by the fluid flowing through the path including the natural gas engine 350.

For the path from the T-junction 320 flowing towards the hydrodynamic device 335, the fluid may flow through a pressure regulator 325 to regulate the pressure of the fluid going into the hydrodynamic device. For example, the pressure may be reduced to a low amount such as less than 5 psi, less than 3 psi, 2 psi, or other pressure regulation. Additionally, the path may include a valve 330 to control the amount of fluid going into the hydrodynamic device 335. For example, the valve 330 may include a PWM valve under the control of a controller (such as the controller 160 or 260) which may regulate the amount of fluid flowing into the hydrodynamic device 335 at a controlled rate. For example, the controller may be aware of the fluid pressure based on the pressure regulator 325 and may control the valve 330 to control the amount of fluid flowing into the hydrodynamic device 335 to a target amount corresponding to a target resistance to the rotation of the natural gas engine 350, which may correspond to a target load on the natural gas engine 350. For example, the controller may maintain a lookup table or database of values of settings of the valve 330 and a corresponding load on the natural gas engine 350. The controller may utilize such a lookup table/database to send a signal to the valve 330 to apply a certain load to the natural gas engine 350 by adjusting the flow rate of the fluid into the hydrodynamic device 335 based on the setting of the valve 330.

Continuing the path involving the hydrodynamic device 335, the fluid may flow out of the hydrodynamic device 335. In some embodiments, the fluid may flow out at a consistent rate through a check valve 340 that may prevent the fluid from flowing back into the hydrodynamic device 335 and into the return path 345. Additionally or alternatively, a supplemental pump or valve may be used to remove fluid from the hydrodynamic device 335 and into the return path 345.

In a second path, the fluid may flow from the radiator 310 to a second pump 315b. The second pump 315b, when powered on, may pump the fluid through a cooling device 355. After flowing through the cooling device 355, the pump 315b may return the fluid through the return path 345 to the radiator 310.

In some embodiments, the cooling device 355 may include a charge air cooler, a lower portion of the charge air cooler, or an intercooler that may utilize water or air to cool the fluid passing through the cooling device 355. For example, the cooling device 355 may operate as a reverse radiator.

Upon returning to the radiator 310, the radiator 310 may cool the fluid before recirculating the fluid throughout the system as illustrated in the diagram 300.

Modifications, additions, or omissions may be made to the system represented by the diagram 300 without departing from the scope of the disclosure. For example, the designations of different elements in the manner described is meant to help explain concepts described herein and is not limiting.

Figure 4A:
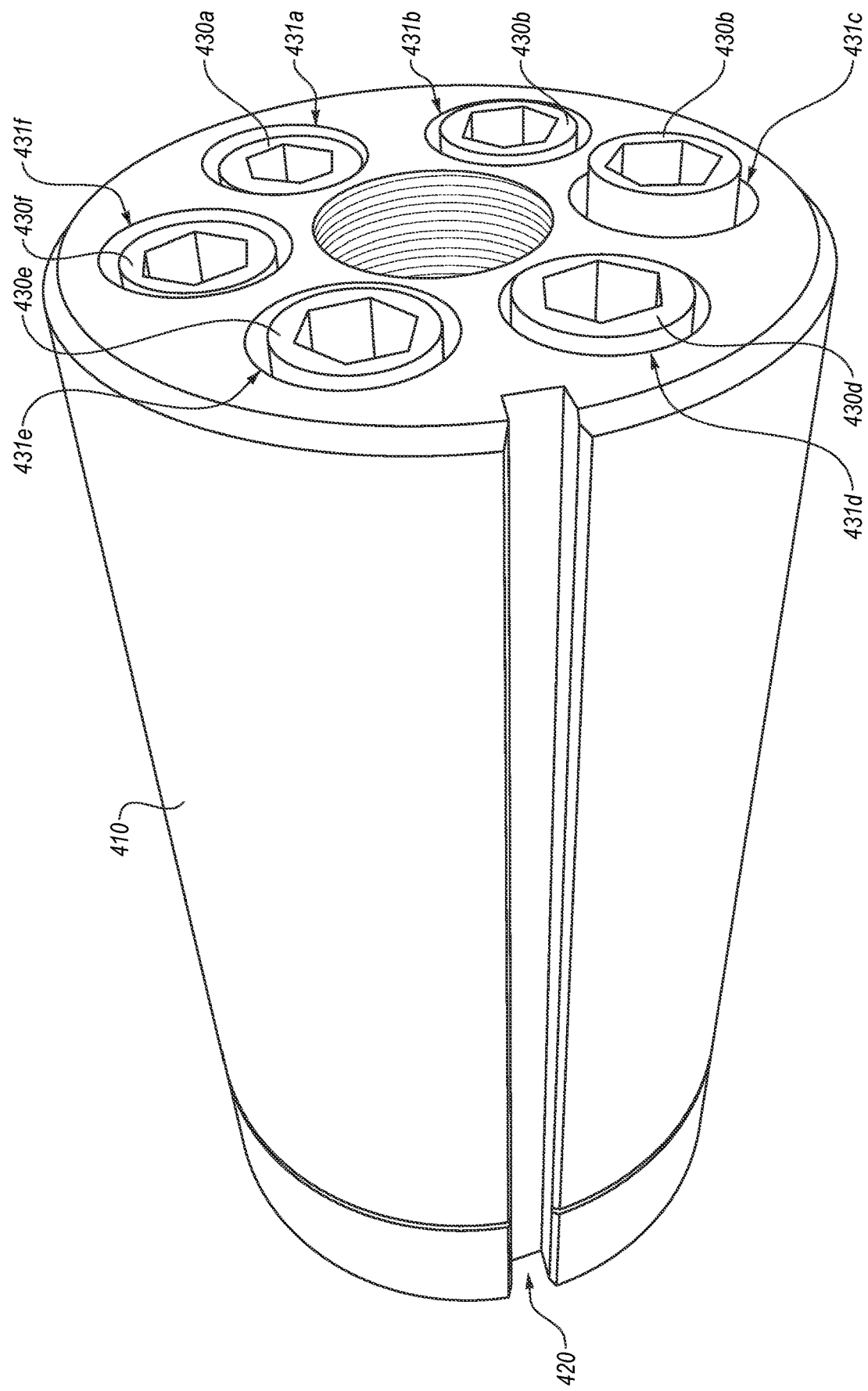
FIGS. 4A and 4B illustrate an example tool for setting timing of a natural gas engine.
Figure 4B:
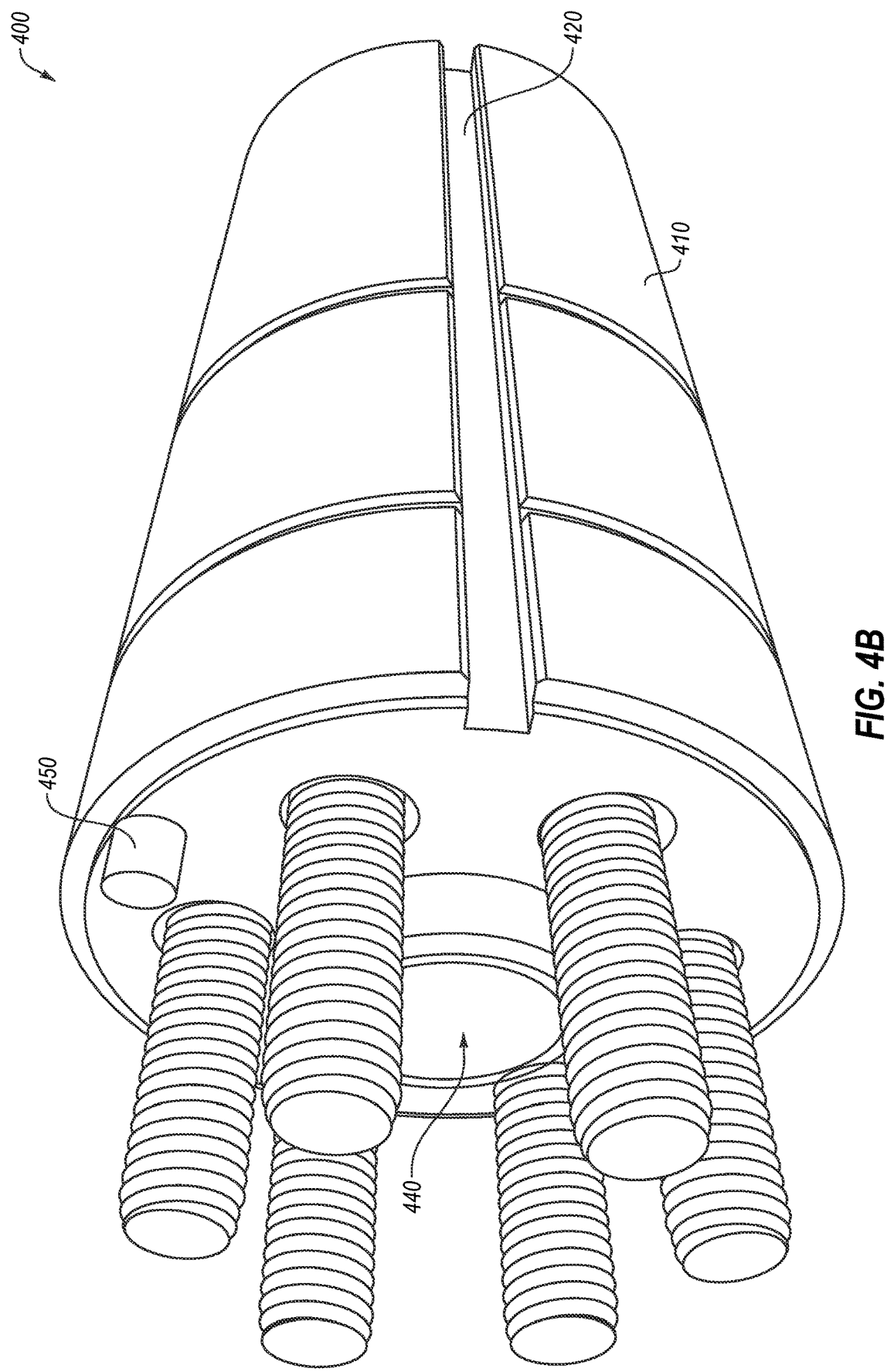

FIGS. 4A and 4B illustrate an example tool 400 for setting timing of a natural gas engine, such as the natural gas engine 110, 210, or 350, in accordance with one or more embodiments of the present disclosure.

The tool 400 may include a cylindrical body 410, a key channel 420, bolt holes 430 (such as the bolt holes 430a-430f), bolts 431 (such as the bolts 431-1431f) disposed within the bolt holes 430, a central channel 440 (which may be used to facilitate another tool to maintain a geislinger within 0.1 degrees of true), and an alignment post 450.

The tool 400 may be mounted on the front of an engine, such as a natural gas engine. For example, the bolt holes 430 may be aligned with corresponding bolt holes on the front of the engine such that the bolts 431 attach the tool 400 to the front of the engine. Additionally or alternatively, the central channel 440 may align with a central channel of the crankshaft of the engine.

The spacing of the key channel 420 and the alignment post 450 may be such that when the tool 400 is mounted to the front of the engine, there is a single orientation with which the tool 400 can be mounted to the front of the engine. For example, the alignment post 450 may align with a timing mark or other feature within the crankshaft on the front of the engine. When doing so, the key channel 420 will only be in one position due to the interface on the front of the engine. For example, the tool 400 may be installed such that the key channel 420 interfaces with the interface on the front of the engine and the crankshaft may be rotated until the alignment post 450 aligns with the timing mark or feature on the crankshaft. Once those two are aligned, the engine may have the timing of the crankshaft aligned consistently with other engines. For example, the same rotational offset of the crankshaft may be achieved due to the consistent orientation of the alignment post 450 for the crankshaft. In these and other embodiments, the position of the alignment post 450 on the tool 400 may be predetermined such that every engine whose timing is arranged using the tool 400 is the same so that timing may be consistent with a pre-programmed operation of the controller.

By providing a consistent timing offset between different engines, the controller may be pre-programmed specifically to operate in a manner that is designed and/or optimized based on the consistent timing. For example, the frequency of ignition, the RPMs of the engine at which gears are to be shifted, among others, are parameters for operating the natural gas engine that may be optimized or designed in the pre-programmed operation of the controller to control the engine based on the consistent timing of the engine. By providing consistent timing, the power produced by the engine and/or the runability of the engine may be improved or maintained within a desirable operating region.

Modifications, additions, or omissions may be made to the tool 400 without departing from the scope of the disclosure. For example, the designations of different elements in the manner described is meant to help explain concepts described herein and is not limiting.

For any of the methods illustrated in FIGS. 5-9, the methods may be performed by any suitable system, apparatus, or device. For example, the system 100, the system 200, the system represented by the diagram 300, and/or the tool 400 may perform or may be utilized in performing one or more of the operations associated with the methods illustrated in FIGS. 5-9. Although illustrated with discrete blocks, the steps and operations associated with one or more of the blocks of any of the methods illustrated in FIGS. 5-9 may be divided into additional blocks, combined into fewer blocks, or eliminated, depending on the particular implementation.

Figure 5:
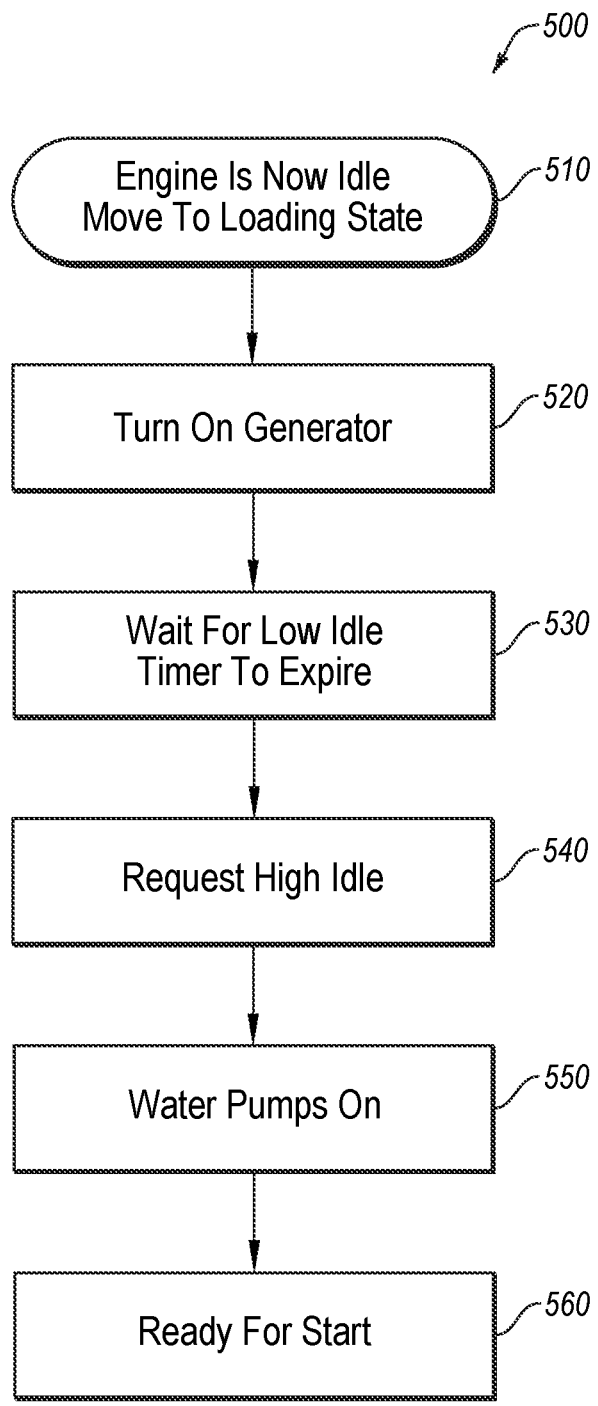
FIG. 5 illustrates a flowchart of an example method of pre-starting a natural gas engine.

FIG. 5 illustrates a flowchart of an example method 500 of pre-starting a natural gas engine, in accordance with one or more embodiments of the present disclosure.

At block 510, a user may request pre-start of a natural gas engine. For example, a user may interact with a user interface on a controller (such as the controller 160 of FIG. 1) to request the pre-start of the natural gas engine (such as the natural gas engine 110 of FIG. 1). Additionally or alternatively, the request may be made remotely and the request may be conveyed over a network to the controller.

At block 520, a generator may be turned on. For example, the controller may issue a command to the generator (such as the generator 130 of FIG. 1) to turn on. Such a command may include instructing the generator to turn the ignition on the generator to begin burning fuel to generate electrical power. The electrical power may be AC or DC power.

At block 530, the controller may wait for a low idle timer to expire. For example, the controller may have a timer for which the controller may wait during which the generator may operate at a low idle (e.g., below a first threshold level of RPMs, such as below 1800 RPMs, below 1795 RPMs, below 1785 RPMs, below 1780 RPMs, below 1775 RPMs, and/or any other ranges). During the low idle timer, the generator may warm up to be prepared to carry a load to supply electrical power to the system. After expiration of the low idle timer, the method 500 may proceed to the block 540.

At block 540, a high idle may be requested. For example, the controller may request that the generator transition to an idle speed with higher RPMs (e.g., above a second threshold level of RPMs, such as above 1800 RPMs, above 1805 RPMs, above 1810 RPMs, above 1815 RPMs, above 1820 RPMs, and/or any other ranges) in further preparation of suppling power.

At block 550, water pumps may be powered on. For example, power may be supplied to the water pumps 315*a* and 315*b* of FIG. 3, which may begin circulating coolant or other fluid throughout the system represented by the diagram 300.

At block 560, the controller may determine that the system is ready to start the natural gas engine. For example, with the water pumps going and electrical power supplied to the system, the controller may recognize that starting the natural gas engine may now be viable.

Figure 6:
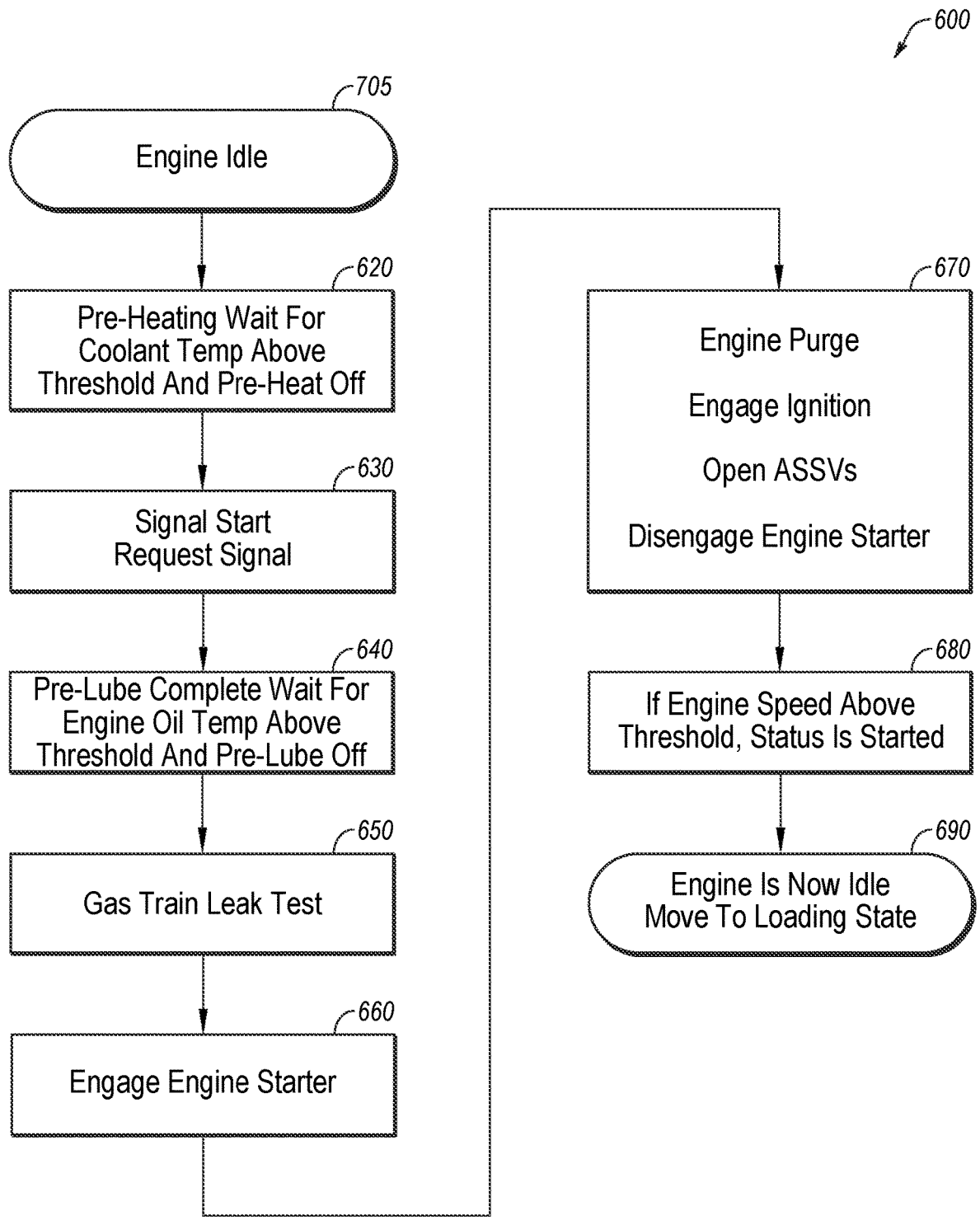
FIG. 6 illustrates a flowchart of an example method of starting a natural gas engine.

FIG. 6 illustrates a flowchart of an example method 600 of starting a natural gas engine, in accordance with one or more embodiments of the present disclosure.

At block 610, a user may request the start of the natural gas engine. For example, the user may interact with the controller to request the start of the natural gas engine.

At block 620, a pre-heating wait for the coolant temperature to reach a first threshold temperature may be undertaken. For example, the controller may monitor a temperature of the coolant while being pumped through the system. In some embodiments, the use of a hydrodynamic device may be used to increase the temperature of the coolant in an expedited manner such that the coolant may come to the first threshold temperature. After the coolant or other fluid reaches the first threshold temperature, the method 600 may proceed to the block 630 and may turn off a pre-heat notification.

At block 630, a start request signal may be sent to the natural gas engine. Such a request may cause the natural gas engine to begin a starting sequence at the natural gas engine that may include multiple operations.

At block 640, a pre-lubrication of the natural gas engine may be performed. For example, the engine oil may be preheated or otherwise prepared to be circulated through the natural gas engine. For example, the controller may monitor a temperature of the oil for the natural gas engine and may wait for the oil to reach a second threshold temperature, and may turn off a pre-lubrication notification once the second threshold temperature is reached. After the oil reaches the second threshold temperature, the method 600 may proceed to the block 650.

At block 650, a gas train leak test may be performed. For example, the controller may perform a diagnostic to verify that the feedline of natural gas to fuel the natural gas engine is without a leak. Such a test may include a chemical or particle sensor that monitors for components of natural gas such as methane.

At block 660, the engine starter may be engaged. For example, a command may be issued by the controller to the starter of the natural gas engine to engage.

At block 670, a series of starting operations may be performed by the natural gas engine. For example, the natural gas engine may be purged (e.g., any residual fuel in the engine may be evacuated), may engage the ignition of the natural gas engine to start up the natural gas engine, may open the automatic safety shut off valves (ASSVs), and/or may disengage the starter. Such processes may cause ignition and starting of the natural gas engine such that it may begin combusting natural gas engine.

At block 680, the controller may monitor a speed of the natural gas engine such that if the speed is above a threshold number of RPMs, the controller may recognize that the natural gas engine successfully started. For example, if the engine is above 300 RPMs, the controller may determine that the natural gas engine has successfully started.

At block 690, the controller may recognize that the natural gas engine is now in an idling state and may begin the process of loading the natural gas engine. For example, the natural gas engine may begin to take on load from a hydrodynamic device and/or the hydraulic pressure device.

Figure 7:
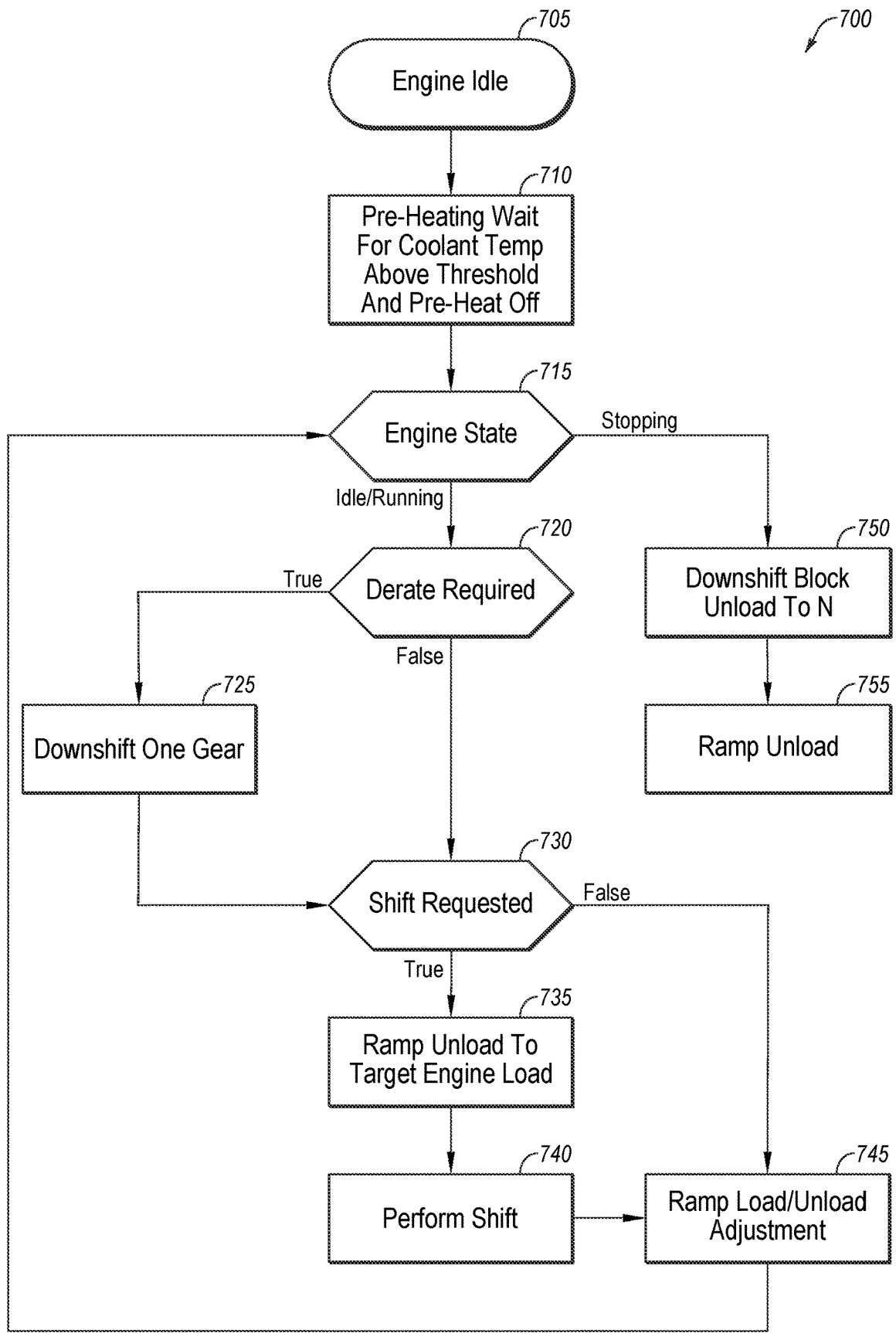
FIG. 7 illustrates a flowchart of an example method of operating a natural gas engine.

FIG. 7 illustrates a flowchart of an example method 700 of operating a natural gas engine, in accordance with one or more embodiments of the present disclosure.

At block 705, the natural gas engine may be in an idle state. For example, the natural gas engine may be in the state described above at the conclusion of the method 600.

At block 710, the controller may monitor that a coolant fluid is above a first threshold temperature and/or that a pre-heat notification is turned off. For example, the controller may wait to perform further operations until the coolant fluid is at least 65° C. and the pre-heat notification is turned off (such as may occur at the conclusion of the block 620 of FIG. 6).

At block 715, the controller may monitor and/or check the status of the natural gas engine. If the natural gas engine is in an idle or running state, the method 700 may proceed to the block 720. If the natural gas engine is in the process of stopping, the method 700 may proceed to the block 750.

At block 720, a determination may be made whether a derate is desired for the natural gas engine. For example, if the natural gas engine is operating outside of a desired range, or if it is desired to cause the natural gas engine to operate in a reduced capacity, the determination may be that a derate is desired. The derate may be requested if operating parameters are such that condensation may be formed in the natural gas engine (e.g., if the pressure of the charge air cooler and the temperature of the coolant fluid is at a level that may cause condensation in the manifold of the natural gas engine). If the derate is desired, the method 700 may proceed to the block 725. If the derate is not desired, the method 700 may proceed to the block 730.

At block 725, the controller may determine that the natural gas engine is to downshift one gear to facilitate the derate of the natural gas engine from the block 720.

At block 730, a determination may be made whether a shift is requested. For example, the block 725 may include a determination for a down shift and include a request from the controller for a downshift. As another example, the controller may monitor the operation of the natural gas engine and/or the transmission and may determine that a shift to a higher gear is desirable. Additionally or alternatively, an operator of the natural gas engine may manually indicate a gear shift is to be performed. If a shift is requested, the method 700 may proceed to the block 735. If a shift is not requested, the method 700 may proceed to the block 745.

At block 735, a ramp unload of the engine may be performed to arrive at a target engine load. For example, the controller may send a signal to the hydrodynamic device to decrease a load on the natural gas engine until it is at the threshold load. For example, the controller may monitor the load on the natural gas engine and in conjunction with the request for a gear shift, the controller may decrease the load on the natural gas engine such that the horsepower being generated by the natural gas engine is within a range in which the natural gas engine may perform the gear shift.

At block 740, the shift in gears may be performed by the transmission. For example, the controller may send a signal to the transmission to transition from one gear ratio to a different gear ratio (whether higher or lower). While the shift in gears is occurring at the block 740, the hydrodynamic device, under the direction of the controller, may maintain the load on the natural gas engine above a threshold load amount. By keeping the load above the threshold load, the natural gas engine may operate in an improved state and may avoid coughing, sputtering, dropping out, or staggering in operation due to a more balanced and steady load on the natural gas engine, even during gear shifting.

At block 745, a ramp load or unload adjustment may be performed on the natural gas engine. For example, the controller may send a signal to the hydrodynamic device to increase or decrease the load on the natural gas engine to be at or above a threshold load (e.g., a 25% load, a 30% load, a 35% load, among others as described herein). In these and other embodiments, the controller may adjust the load in large steps (whether increasing the load or decreasing the load) which may be referred to as gross steps. When the load is within one gross step of the threshold load, the controller may transition over to using more fine steps to fine tune the load to be at or above the threshold load.

At block 750, after it is determined at the block 715 that the engine is in a stopping state, a downshift block unload may be performed to a neutral gear. For example, the hydraulic pressure device and/or the transmission maybe disengaged from the natural gas engine. While this is occurring, the load on the natural gas engine may be maintained by the hydrodynamic device such that the load remains at or above the threshold load.

At block 755, after the downshift and block unloading, the controller may utilize a ramp unload operation to remove the load imposed on the natural gas engine by the hydrodynamic device. For example, the controller may send a signal to the PWM valve of the hydrodynamic device to gradually remove the load. In some embodiments, the unloading may occur in a similar manner described with reference to block 745, with gross steps of unloading initially, followed by more gradual fine steps. Additionally or alternatively, the unloading may occur in a series of gross steps without using the fine steps.

Figure 8:
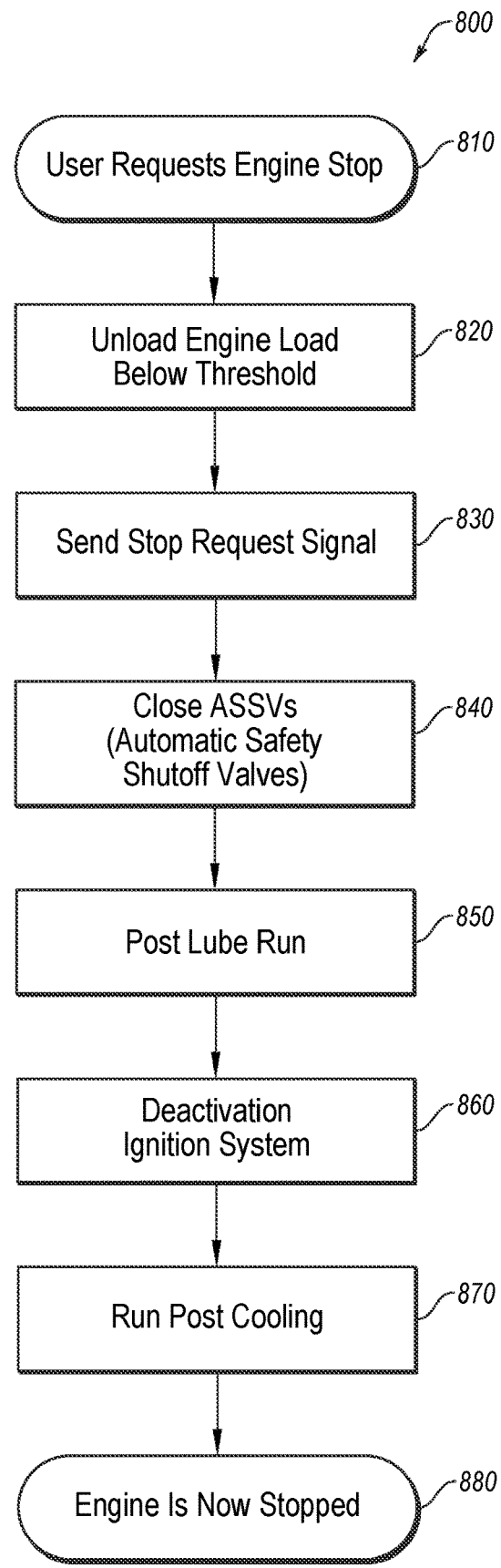
FIG. 8 illustrates a flowchart of an example method of stopping a natural gas engine.

FIG. 8 illustrates a flowchart of an example method of stopping a natural gas engine, in accordance with one or more embodiments of the present disclosure.

At block 810, a user may request a stop of the natural gas engine. For example, the user may interact with a user interface of the controller to request stopping the natural gas engine.

At block 820, the natural gas engine may be unloaded below a shutdown threshold. For example, the controller may send a signal or series of signals to the hydrodynamic device to decrease the load on the natural gas engine until it is below the shutdown threshold. The shutdown threshold may be below 10%, below 7%, below 5%, below 3%, or any other comparable range.

At block 830, a stop request signal may be sent to the natural gas engine.

At block 840, ASSVs may be closed by the natural gas engine.

At block 850, a post-lubrication operation may run. For example, the natural gas engine may continue to circulate oil or other lubricant through the natural gas engine for a threshold duration of time after closing the ASSVs and before turning off the ignition. Such a duration may include one minute, 45 seconds, 40 seconds, 30 seconds, or any other duration of time.

At block 860, an ignition system may be deactivated. For example, the natural gas engine may be placed in a state where it no longer combusts natural gas.

At block 870, a post-cooling operation may be performed. For example, the pumps may continue to operate to pump coolant or other similar fluid throughout the natural gas engine and the related systems for a set period of time after the ignition of the engine is deactivated. For example, the pumps may continue to circulate the coolant for one hour, 50 minutes, 45 minutes, 40 minutes, 30 minutes, 15 minutes, or any other duration. Such an operation may facilitate a gradual and controlled return of the natural gas engine to ambient temperatures. In some embodiments, an operator of the natural gas engine may request a re-start of the engine during the post-cooling operation. Doing so may cancel the remainder of the post-cooling operation and the controller may undertake the startup operations (e.g., one or more of the operations associated with the method 600).

At block 880, the controller may designate the natural gas engine in a stopped state.

Figure 9:
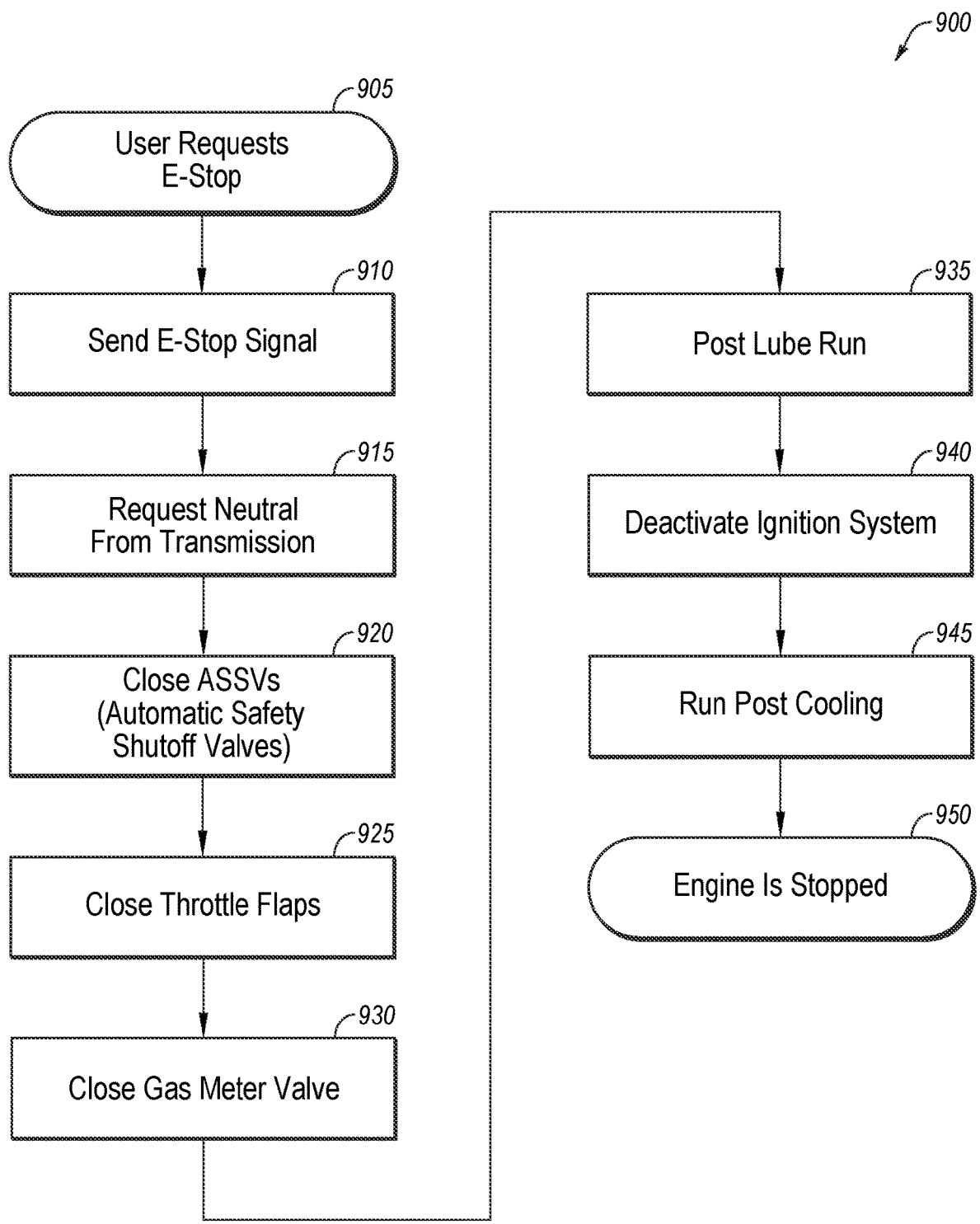
FIG. 9 illustrates a flowchart of an example method of emergency stopping a natural gas engine.

FIG. 9 illustrates a flowchart of an example method 900 of emergency stopping a natural gas engine, in accordance with one or more embodiments of the present disclosure.

At block 905, a user may request an emergency stop. For example, a user may press an emergency stop button near the wellbore, from a control station associated with the drilling site, or any other location. Additionally or alternatively, an emergency stop may be triggered by a fail-safe or safety feature of the system, such as a fire suppression system being triggered, the generator stopping, or some other condition.

At block 910, an emergency stop signal may be sent to the natural gas engine. In some embodiments, this may be conveyed through a hard-wired connection such that even if wireless or other electronic communications are interrupted, the emergency stop signal may be conveyed.

At block 915, a request for neutral may be sent to the transmission. For example, the controller may send a signal to the transmission to shift to neutral.

At block 920, the ASSVs may be closed.

At block 925, the throttle flaps may be closed.

At block 930, the gas meter valve may be closed.

At block 935, the post-lubrication operation may be performed, which may be similar or comparable to the block 850 of FIG. 8.

At block 940, the ignition system may be deactivated, which may be similar or comparable to the block 860 of FIG. 8.

At block 945, the post-cooling operation may be performed, which may be similar or comparable to the block 870 of FIG. 8.

At block 950, the engine may be identified by the controller as being in a stopped state.

Modifications, additions, or omissions may be made to any of the methods 500, 600, 700, 800, and/or 900 without departing from the scope of the disclosure. For example, the designations of different elements in the manner described is meant to help explain concepts described herein and is not limiting. Further, the methods 500, 600, 700, 800, and/or 900 may include any number of other elements or may be implemented within other systems or contexts than those described.

Figure 10:
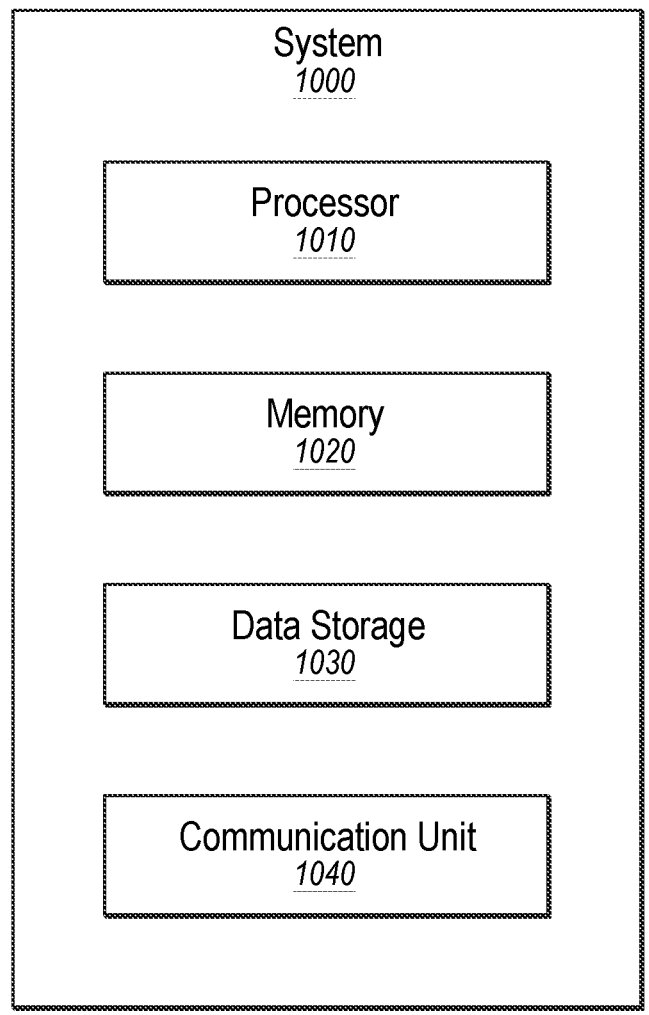
FIG. 10 is an example computing system.

FIG. 10 illustrates an example computing system 1000, according to at least one embodiment described in the present disclosure. The computing system 1000 may include a processor 1010, a memory 1020, a data storage 1030, and/or a communication unit 1040, which all may be communicatively coupled. In some embodiments, the controller 160 of FIG. 1 may be implemented as the computing system 1000.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to perform any of the methods 500, 600, 700, 800, and/or 900 of FIGS. 5, 6, 7, 8, and 9, respectively. For example, the processor 1010 may obtain instructions regarding obtaining software-repository packages, extracting programming-language functions from the software-repository packages, identifying curation resources, generating code descriptions based on the curation resources, determining function-comment pairs, and/or generating a programming language corpus.

The memory 1020 and the data storage 1030 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1010. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising:
    a natural gas engine including a first driveline at a front end of the natural gas engine;
    a resistive device configured to provide a variable electrically-controllable resistive force on the natural gas engine;
    a controller in communication with the natural gas engine and the resistive device, the controller configured to automatically adjust the variable electrically-controllable resistive force to maintain a working load on the natural gas engine at or above a threshold load;
    a transmission for changing between gears, wherein the controller is configured to adjust the variable electrically-controllable resistive force to increase the working load on the natural gas engine when the transmission down-shifts; and
    a second driveline located on a second side of the natural gas engine opposite from a first side of the natural gas engine, the first side associated with the resistive device, the transmission interfacing with the natural gas engine at the second side.

2. The system of claim 1, wherein the resistive device includes a hydrodynamic device configured to convert mechanical energy of the natural gas engine into heat in a working fluid within the hydrodynamic device, an amount of fluid in the hydrodynamic device controlled by an electronically controllable valve to provide the variable electrically-controllable resistive force on the first driveline.

3. The system of claim 2, wherein the working fluid includes engine coolant for the natural gas engine, the working fluid circulating between both the natural gas engine and the hydrodynamic device.

4. The system of claim 2, wherein the controller is configured to completely close the electronically controllable valve when the working load is at or above double the threshold load.

5. The system of claim 2, wherein the controller is configured to incrementally close the electronically controllable valve to the hydrodynamic device as a working load on the natural gas engine increases.

6. The system of claim 1, wherein the resistive device includes an eddy brake that is controlled by the controller to create an electromagnetic field that imposes the variable electrically-controllable resistive force on the first driveline.

7. The system of claim 1, wherein the resistive device includes an electric generator that is controlled by the controller and is configured to provide the variable electrically-controllable resistive force on the first driveline based on an amount of electricity generated by the electric generator.

8. The system of claim 1, wherein the resistive device includes an oil shear brake that is controlled by the controller and is configured to provide the variable electrically-controllable resistive force based on a frictional force occurring within a stack of discs and plates to which the first driveline is coupled with fluid between the stack of discs and plates.

9. The system of claim 1, wherein the threshold load is between twenty five percent and sixty percent load on the natural gas engine.

10. The system of claim 1, wherein the first driveline is configured to mechanically decouple the resistive device from the natural gas engine.

11. The system of claim 10, wherein the controller is configured to direct the first driveline to mechanically decouple the resistive device from the natural gas engine when a working load on the natural gas engine exceeds a second threshold.

12. The system of claim 11, wherein the second threshold includes approximately double the threshold load.

13. The system of claim 1, further comprising a third driveline mechanically coupling the transmission and a hydraulic pressure device.

14. The system of claim 13, wherein the hydraulic pressure device is configured to generate hydraulic pressure significant enough to perform hydraulic fracturing.

15. The system of claim 1, further comprising a vehicle trailer upon which the natural gas engine, the resistive device, and the transmission are mounted.

16. The system of claim 1, wherein the first side of the natural gas engine includes a dry housing and the second side of the natural gas engine includes a wet housing.

17. The system of claim 16, wherein timing of the natural gas engine is set at the first side of the natural gas engine.

18. The system of claim 1, further comprising a generator that burns fuel to produce alternating current (AC) power to provide electricity to the controller and the resistive device.

19. The system of claim 1, wherein the controller is configured to maintain the load on the first driveline while the transmission performs upshifting and downshifting.

20. A system comprising:
- a natural gas engine including a first driveline at a front end of the natural gas engine;
- an electric generator that is controllable to provide a specific amount of load on the natural gas engine on the first driveline as a variable electrically-controllable resistive force, the variable electrically-controllable resistive force based on an amount of electricity generated by the electric generator;
- a controller in communication with the natural gas engine and the electric generator, the controller configured to automatically adjust the amount of electricity generated by the electric generator to thereby control the variable electrically-controllable resistive force to maintain a working load on the natural gas engine at or above a threshold load;
- a transmission for changing between gears wherein the controller is configured to adjust the electric generator to increase the amount of electricity being generated when the transmission down-shifts; and
- a second driveline located on a second side of the natural gas engine opposite from a first side of the natural gas engine, the first side associated with the resistive device, the transmission interfacing with the natural gas engine at the second side.

* * * * *